Feb. 9, 1954
O. G. PATCH
2,668,437
APPARATUS FOR METERING ENTRAINED AIR
OR GAS BY PRESSURE OBSERVATIONS
Filed Jan. 12, 1951
2 Sheets-Sheet 1
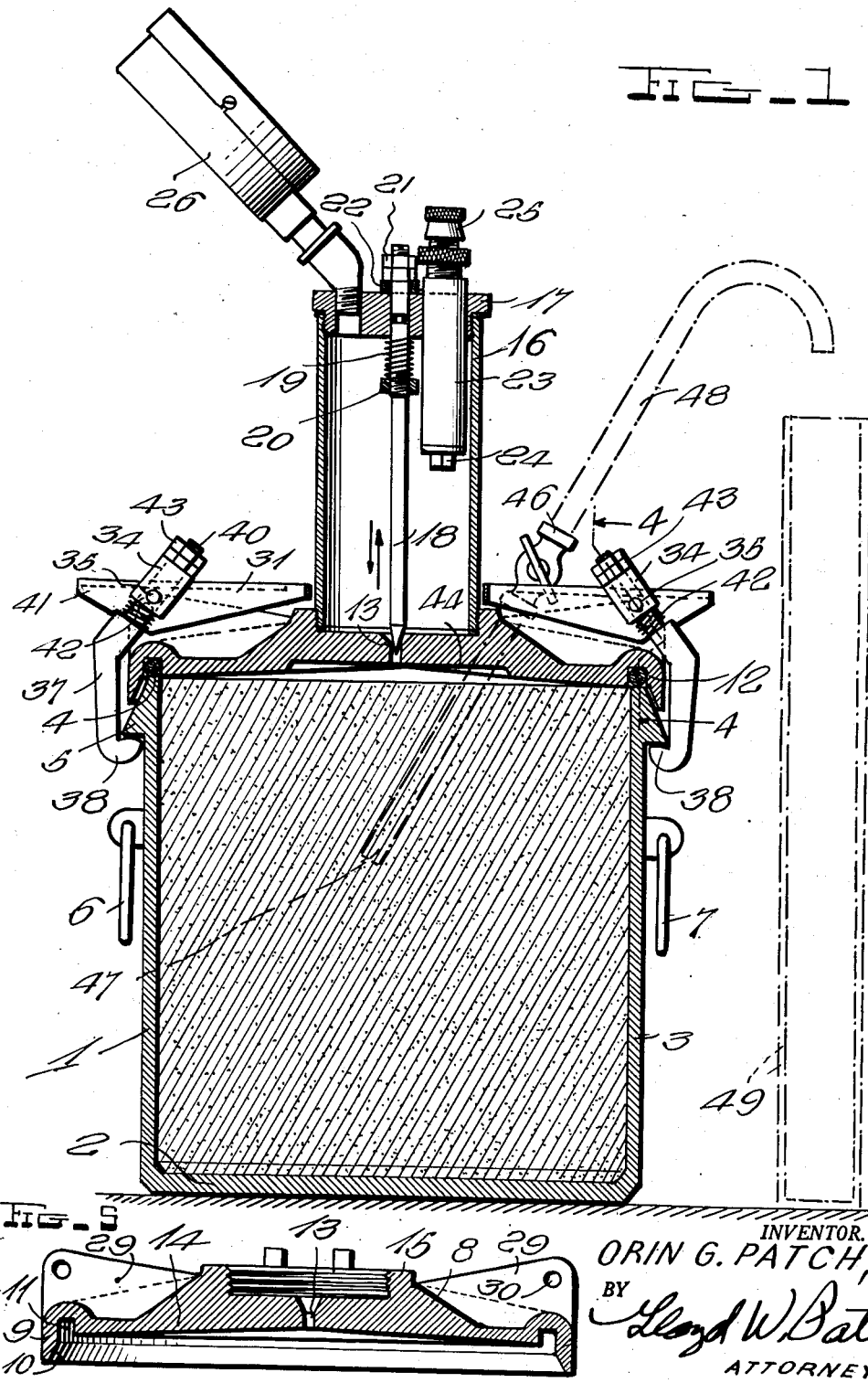
INVENTOR.
ORIN G. PATCH,
BY Lloyd W. Patch
ATTORNEY

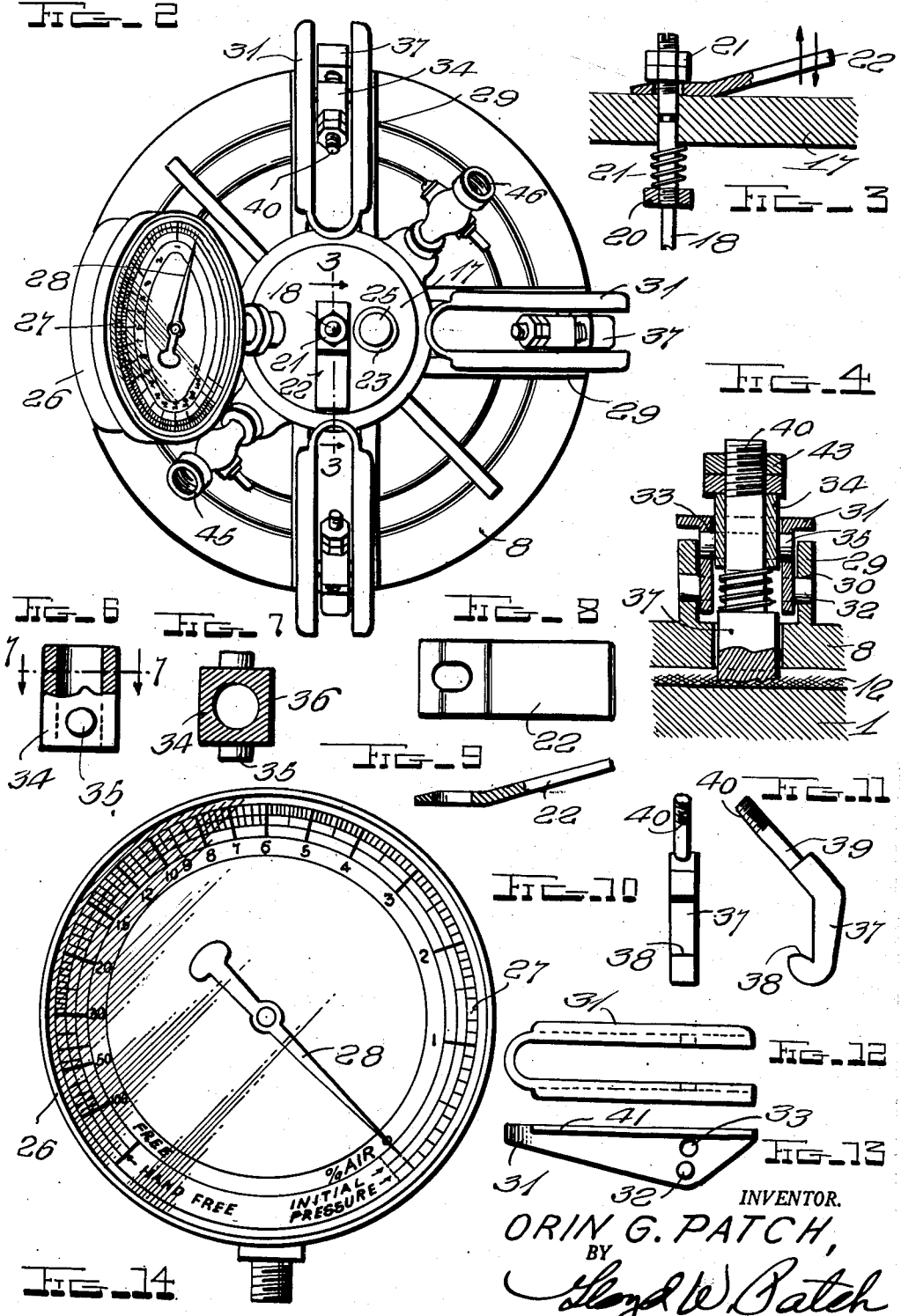

Patented Feb. 9, 1954

2,668,437

UNITED STATES PATENT OFFICE

2,668,437

APPARATUS FOR METERING ENTRAINED AIR OR GAS BY PRESSURE OBSERVATIONS

Orin G. Patch, Wenatchee, Wash., assignor, by decree of distribution, to Clara L. Patch Application January 12, 1951, Serial No. 205,752

12 Claims. (Cl. 73—19)

My present invention relates to apparatus for metering entrained air or gas by pressure observations, and pertains particularly to apparatus for use in metering or measuring to ascertain or determine the percentage or proportion of entrained air or other gaseous fluid present in a wet mixture of fresh concrete or other plastic material.

An object of this invention is to provide an improved pressure type air meter that is accurate and sensitive and rapid in its determinations or tests; and, which is simple and durable and compact and can be made of such size and weight as to be readily portable to thus adapt the meter for use in the field or on the job or at any other place it may be desired to test fresh concrete or other materials.

A further object is to provide apparatus of the nature set forth in which the parts are associated and assembled to prevent misplacement or loss; and, which utilizes the principle of Boyle's law, and is designed to simplify the procedure for accurately determining the air and gas content of a sample of fresh concrete or other like plastic.

A still further purpose is to provide apparatus which includes a container of known volume for the test sample with a close cover, and with which any space above the sample material is completely and quickly filled with liquid (usually only a few spoonfuls of water being required), so that the test can be carried out with extreme accuracy and without errors due to variations of the sample strike-off or the pressure of atmospheric air or any other reasons, the apparatus being such that at the commencement of a test the percentage of non-entrained air within the closed sample container is at zero.

Another object of my invention is to provide apparatus for ascertaining or determining the percentage of entrained air or other gaseous fluid by pressure observations, in which the resultant determination is not affected by local and weather conditions, by variations in atmospheric conditions, by changes in barometric pressure, by differences in altitude; or, by changes in water-cement ratio, sand-cement ratio, said-to-gravel ratios, inaccuracies in specific gravity determinations, and uncertainties as to absorbed or free water content of the aggregates used in the mix.

Yet another object is to provide apparatus for entrained air metering by pressure observations reduced to percentages or the like, thus eliminating necessity for computations and manipulations of a technical nature, thereby making the measurement of entrained air or gas possible by simple and rapid procedures that can be carried out by anyone without the necessity of employing complicated laboratory or other equipment and apparatus, and without necessity of mathematical or other computations and calculations or other special mental processes or difficult manual manipulations or special training.

Still another object is to provide apparatus employing pressure gage structure which will visibly and directly show the percentage of air and gaseous fluid in concrete mixtures and like materials, as entrained air or gas is compressed in the mixture.

With the above and other objects in view, some of which will be apparent to those skilled in the art, and others of which are inherent in the use of the apparatus, my present invention includes certain novel features of construction and combination and arrangements of parts and the carrying out of certain novel method and process steps, which will be hereinafter set forth in connection with the drawings, and then pointed out in the claims.

In the drawings:

Figure 1 is a vertical sectional view taken substantially centrally through entrained air metering apparatus disclosing an embodiment of my invention and with the parts assembled as in use.

Fig. 2 is a top plan view of the apparatus.

Fig. 3 is a fragmentary sectional view substantially on line 3—3 of Fig. 2, to better show the construction and mounting and control of the air needle valve.

Fig. 4 is a fragmentary sectional view substantially on line 4—4 of Figure 1 showing the cover and cover clamping and packing structure.

Fig. 5 is a sectional view substantially through the meter base cover.

Fig. 6 is an enlarged side view partly in section at one of the cover clamp trunnions.

Fig. 7 is a transverse sectional view on line 7—7 of Fig. 6.

Fig. 8 is a top plan view of the air needle valve control lever.

Fig. 9 is a side elevation of the control lever with parts in section.

Fig. 10 is an elevational view of one of the cover clamps.

Fig. 11 is a view at right angles to the showing in Fig. 10.

Fig. 12 is a top view of one of the cover clamp toggle levers.

Fig. 13 shows a side elevational of the toggle lever.

Fig. 14 is an enlarged view in front elevation showing the pressure gage, and with the indicating hand thereof in the zero percent air position after being released from the "initial pressure" or test starting position.

During the past few years considerable development has been made in new and better concrete mixes, and this has shown great advantages in the use of air entrained concrete. Such use has demonstrated the desirability and necessity of determining and frequently checking the percentage of purposefully entrained air for the particular mix of concrete.

Air entrained concrete has been defined as a concrete mixture having a controlled and even distribution of millions of tiny disconnected air or gas cells throughout the mix, which cells act somewhat after the manner of microscopic ball bearings to keep the fine and coarse aggregate materials uniformly distributed and at the same time preventing bleeding and segregation and promoting workability as the concrete is dumped and poured or chuted into place.

Originally developed to improve the durability of concrete pavement and like structures as measured by freezing and thawing and the application of de-icing salts or calcium chloride, air entrainment is now in nearly universal acceptance for all types of concrete work as one of the greatest improvements in concrete technology in recent years.

Air entrainment affords the opportunity of making substantial sand and water reductions with resulting decreased shrinkage, bleeding and segregation. Air entrained concrete is easier to place and finish, and a concrete mixture having entrained air or gas slips into place with a minimum of vibrating or spading or tamping, all of which results in important economies.

The amount of entrained air or gas considered desirable to attain the maximum benefits is in the range of 3 percent to 6 percent of the volume of ordinary concrete. Less than 3 percent gives little improvement, and air or gas entrained in excess of 6 percent may result in a loss of strength with no compensating advantage. When the amount of entrained air or gas is properly controlled within these limits and correct reductions are made in water and sand to maintain a desired yield, by compensating for the amount of air or gas added, little loss of strength occurs.

It will be obvious that it is important to frequently determine the amount of entrained air or gas in concrete when using admixtures of air or gas entraining agents. Mixes are designed for an optimum amount of air, and frequent tests are desirable so that the correct amount of air or gas entraining agent can be maintained. Further, changes in aggregate grading, slump, temperatures, type of cement, or other factors, may often change the amount of air or gas entrained and this further heightens the desirability of being able to make frequent tests at the point of mixing in the field, or on the job, or at other points or places away from a laboratory and by a person having only ordinary skill.

My present invention embraces apparatus and a method for utilizing the principles of Boyle's law, and the primary purpose is to simplify the procedure for accurately determining the entrained air or gas content of fresh concerete mixes. With my apparatus and method, the amount of water used is reduced to in most instances only a few teaspoonfuls, added in a matter of a few seconds to eliminate non-entrained air. This insures accuracy but does not disturb the sample. Since measurements are made by pressure observations and a pressure gage, by equalizing a known volume of air at a known pressure in a sealed air chamber with an unknown volume of air or gas in the concrete of the mix, changes in barometric pressure do not affect the results as such pressures are balanced in both chambers; and therefore, the test is made independent of and entirely eliminates the problem of correcting for barometric pressures, thus substantially reducing the time required to make a complete test and at the same time insuring that a reading of the pressure gage gives an accurate determination.

A base cup 1 is provided with a flat bottom on which the apparatus is placed at rest on a table or other suitable support, and the sidewall 3 of the base cup is substantially cylindrical in its outline, rising from the flat bottom 2 and terminating in an open top 4. This base cup is made up to an exact volume, and it has been found that a readily portable and conveniently sized apparatus can be made up with the base cup of exactly .250 cu. ft. in volume capacity. By having this base cup of an exact volume capacity, the user can readily reach determinations with respect to the entire volume of the concrete mix.

As stated, the base cup has an open top at 4, and a clamping flange or ring 5 is provided annularly around the outer wall of the base cup slightly below the open top 4. For convenience in handling and lifting and transporting the apparatus, handles 6 and 7 of any desired type can be provided on the base cup 1.

A base cover 8 has a depending annular rim flange 9 of sufficient diameter to freely receive the open top edge 4 of the sidewall 3 of the base cup 1, and this flange is preferably beveled on its inner side to clear the clamping flange or ring 5 and accurately center the cover on the base. On the lower side of the base cover an annular packing groove 11 is provided inside of flange 9 and of sufficient width to receive the open cup edge 4 of the sidewall 3. An O-ring packing member 12 is fitted and held in the annular packing groove 11 so that as the base cover is fitted in place the packing member will contact the open top edge 4 of the base cup. An air inlet opening 13 is provided substantially centrally through the base cover 8. The lower side of the base cover is preferably slightly tapered upwardly from the packing groove 11 to the air escape channel 44 leading to the two cocks 45 and 46 as indicated at Fig. 1.

On the upper side of the base cover 8, an annular flange 15 is provided in upstanding relation around the air opening or passage 13, and a substantially cylindrical tubular pressure chamber body 16 is externally screw threaded at one end and is turned into the screw thread of the flange 15. The pressure chamber body 16 is internally screw threaded at its upper end, and a pressure chamber cap 17 is provided with a screw threaded portion so that this cap can be mounted in place to close the upper end of the pressure chamber body. The pressure chamber cap 17 has an opening therethrough substantially in alignment with the air opening or passage 13, and an air needle valve 18 is slidably mounted in this opening with its valve end in position to close into the opening or passage 13. A pressure spring 19 is fitted around the upper portion of the air needle valve 18 to exert yielding force between the under side of the pressure chamber cap and an adjusting nut 20 and the air needle valve 18, so that this needle valve is normally urged to a closed position. An O-ring packing, or other suitable packing will be provided around the air needle valve 18 where this valve is slidably mounted through the opening in the top 17, and leakage at this point is thus avoided. The outer end of the needle valve 18 can be provided with a cross slot, or spanner openings, or with other formation that will permit placement of a tool to be used in turning the needle valve and grinding in the needle point against a valve seat provided around the air passage or opening 13, and the outer end of the needle valve stem is externally screw threaded to receive the internally screw threaded nuts 21 which serve as abutment and lock nuts disposed on the outer side of the cap 17. A needle valve operating lever 22 is provided with an opening loosely receiving the outer portion of the stem of the needle valve 18, the operating lever being rockably disposed on the outer side of the cap 17 and in position to become contacted by the inner nut 21. As perhaps best illustrated in Fig. 3, this lever 21 is normally held in inoperative position by reason of the fact that spring 19 bears against adjusting nut 20 and resiliently urges the needle valve 18 to the closed position. However, as illustrated by the arrows, the needle valve operating lever 22 is angularly disposed at its outer end so that pressure can be exerted to rock this lever and thus exert force against the inner nut 21 to open needle valve 18 against the resilient force exerted by spring 19.

An air pump 23, which in the present instance is illustrated as an ordinary cylinder pump of usual construction, has the cylinder thereof mounted through an opening provided through the cap 17, and this pump has its air supply end 24 within the pressure chamber body 16, the air intake being outside so that atmospheric air can be compressed within the pressure chamber body to attain desired pressure therein. In the present instance I have shown the pump 23 as having an operating handle 25 disposed above the cap or cover 17.

A pressure gage 26 is connected with and carried by the pressure chamber cap 17 with the pressure passage thereof communicating with the pressure chamber, and as disclosed in Figs. 1 and 2, it is preferable that this pressure gage be angularly disposed so that the indicating dial or face 27 and the indicating hand 28 can be more readily viewed while the user is in position to manually operate the pump 23 and the needle valve operating lever 22.

On the upper side of the base cover 8, I provide a plurality of sets of clamp bearing ribs 29, the various sets of ribs being disposed substantially radially around the annular flange 15 and being substantially equidistantly spaced so that clamps carried thereby will accomplish substantially equal pressure on all parts of the base cover 8. Each set of clamp bearing ribs 29 is provided with aligned bearing openings 30. Substantially U-shaped cover clamp toggles 31 are provided for each set of clamp bearing ribs, and the side portions of these U-shaped cover clamp toggles 31 have bearing pinholes 32 to receive pins protruding inwardly from the bearing openings 30, to thus ipvotally mount the cover clamp toggles. As perhaps best shown in Fig. 13, the side portions of the U-shaped cover clamp toggles are widened out in the area of the bearing pinholes 32, and these arms are provided with bearing openings 33 offset laterally with respect to the mounting of the bearing pins 32.

Cover clamp trunnions 34 have the body portions thereof made substantially rectangular and have a dimension to fit between the side bars of the cover clamp toggles 31, and these cover clamp trunnions have pintle pins 35 extending laterally on each side and fitted in the bearing openings 33 of the substantially U-shaped cover clamp toggles 31. The cover clamp trunnions 34 have clamp bolt openings 36 therethrough.

Cover clamp members 37 have clamp hooks 38 at one end, and clamp bolts 39 extending angularly at the other end of the body portion thereof, as perhaps best illustrated in Fig. 11, the clamp bolts being screw threaded at their outer ends, as at 40. The body portions of the cover clamp members 37 are preferably made substantially rectangular so that they will fit between the side arms of the substantially U-shaped cover clamp toggles 31, and extension arm portions 41 are preferably provided on the cover clamp toggles 31 so that the cover clamp members will be restrained against rotation as the clamp bolt portions 39 are fitted through the openings 36 of the cover clamp trunnions 34. Coil springs 32 are fitted around the clamp bolt portions 39 to bear between the body portions 37 and the cover clamp trunnions 34 so that the clamp bolts 39 will be normally resiliently urged outwardly with respect to their fitting through the clamp bolt openings 36, and adjusting nuts 43 are turned onto the screw threaded ends 40. It is preferable that two nuts 43 be provided on each bolt end, so that adjustments can be made and set as may be desired.

With the cover clamp structure as described, when it is desired to release the cover from the locked position as shown in Figure 1 of the drawings, the cover clamp toggles 31 will be swung upwardly and outwardly from the position shown, and the clamping force of the cover clamp trunnions 34 will thus be released. At the same time, the cover clamp trunnions are moved outwardly and downwardly so that the hook portions 38 may be moved outwardly to clear the clamping shoulder of the clamping ring or flange 5. If hook 39 is held free from flange 5 while trunnion 34 is pressed back to locking position the hook will not re-engage rims. When the parts in this relation, the base cover 8 can be removed or replaced easily and freely. The cover can be again readily fitted in place and the clamps can be set in clamping relation by reverse movement.

On the under side of the base cover 8, a cross groove passage 44 is provided, and petcocks 45 and 46 located on the outer side of the cover 8 have their passageways in communication with this cross groove so that communication will be established with the air opening or passage 13. The base cup 1 and cover 8, and other parts can be made of aluminum alloy or other suitable material that will give desired strength and will yet make the device or apparatus sufficiently light for ready and convenient transportation, and various other portions of the structure can be of materials and design and construction which is suitable for the purpose intended. As perhaps best shown in Fig. 14, the indicating dial or face of the pressure gage is graduated in indications and markings from a determined "initial pressure" line to a "free" position where the indicating hand will cease to function because of a maximum drop to atmospheric pressure. In the present instance, the indicating dial or face 28 has the "initial pressure" position somewhat beyond or back of zero, and the indications are then marked progressively to designate the percentage of entrained air as indicated by pressure drop. The needle will drop from the dotted line to the zero line due to "give" at cup, cover and seal, when there is no air in sample, thus registering "zero."

In the use of my improved apparatus, and in the carrying out of my present method, the cover clamp structure is released in the manner as described and the cover is removed. The user then fills the base cup 1 with a sample of fresh concrete, placing this sample in the base by vibrating or tamping in much the same manner as the concrete is to be placed on the job. The cup is filled to the rim of the open top, and the operator then strikes off the base, level full, with a straight edge or other suitable tool or implement resting upon the top edge 4. This top edge 4 is then wiped clean, and the cover is fitted in place with the O-ring packing member 12 resting against and upon the open top edge 4, the two petcocks 45 and 46 being open. By manipulation of the clamping structure, and with the clamp hooks 38 engaging underneath the shoulder of clamping flange or ring 5, the base cover 8 is clamped and is securely held in place on the open top of the base cup 1, the O-ring packing 12 serving to establish a fluid tight joint between the base cup and the base cover. Using a bulb syringe, or other suitable liquid supply means, the user then injects water through one petcock until all air is expelled at the opposite petcock. Due to the fact that the O-ring packing 12 will compress slightly, the material of the concrete sample will ordinarily rise somewhat within the tapered portion 14, and ordinarily it will be necessary to supply only a relatively small quantity of water, perhaps not more than a couple of tablespoonfuls.

With the built in pump, the operator actuating the handle 25 pumps up an air pressure within the cylindrical pressure chamber body so that the pressure gage 26 will be brought to the dotted "initial pressure" line on the gage. The user then waits a few seconds and stabilizes the hand on the dial at that line, by pumping up or bleeding with the needle valve, whichever is necessary.

The apparatus is now ready for making a test, and the user closes both petcocks 45 and 46. Next, the operator presses down on needle valve operating lever 22 to release the air pressure within the pressure chamber body 16 through the air escape passage 13. The needle valve operating lever is held down for a few seconds, lightly tapping the gage with the finger to stabilize the hand on the dial and assure that the gage indicating hand is at a substantially stabilized point. The delay in stabilizing the pressure is due to the cooling effect of exausting air from chamber 16, which soon warms up again to room temperature in both chamber 16 and in the top of the base 1. The user then reads the figures on the dial 27, and can thus determine, without calculations or computations, the percentage of entrained air and gas in the sample of the concrete as contained in the base cup.

When the test has been completed, one or both petcocks 45 and 46 can be opened and the pressure in the base cup will be relieved. The pressure in the pressure chamber body being held by the needle valve can remain. Then, the clamp structure can be readily and quickly released, the test sample of concrete within the base cup 1 can be emptied, and the parts can be readily wiped or washed to be available for future use and tests.

By graduating and marking the dial 27 to show or indicate percentages of air, and by making the base cup 1 of substantially .250 cu. ft. capacity, it is possible for the user to make determinations that will indicate the unit weight per cubic foot or cubic yard, of a particular concrete mixture of which the sample is a part, and any corrections to vary the result as indicated by the test can be accurately and readily determined.

While the gage 26 can be made to be extremely critical and accurate, there may be times when it is desired to calibrate the gage, or to check upon the accuracy; and, in Figure 1 I have indicated by dot and dash lines some features or apparatus that are provided for making such calibrations or tests. This is a part of the present invention. Calibration can be readily accomplished by the use of water filled into the base cup 1, and a water inlet tube 47 can be connected on the inner side of one of the petcocks to extend well down into the base cup. A water outlet and discharge tube 48 is connected with the outer end of the same petcock, and has its discharge end curved to discharge downwardly. A tall narrow tubular vessel 49 is provided to be placed beneath the discharge end of the outlet and discharge tube 48, and this vessel 49 is graduated or calibrated in 5 percent markings or any other desired indications. With this apparatus, it will be apparent that by pumping up the pressure in the tubular pressure chamber 16 with the base full of water, the user making the test can open the needle valve 18 through pressing upon the needle valve operating lever 22, and draw off through tube 48 any desired percent of water leaving an equivalent percent of air in the base cup, and then by running a test in the usual way can determine whether the percent water discharged into the graduated tubular vessel 49 and the readings of the gage correspond, and thus accurate testing and correction and calibration can be made.

As stated, the gage 26 has the indicating dial or face thereof marked or calibrated so that it records the percentage of air directly as figured upon the volume of the base cup. Various starting pressures could be used and it is possible for the gage to be calibrated in other than percentage indications. In the present instance, the dial of the gage is so calibrated that it records the percentage of air in the base directly. This is determined by the actuation $PV=P'V'$, based on the known pressure and volume of the pressure chamber and the determined resultant pressure in the equalized volume.

My improved process or method is accomplished by successively carrying out the several steps and procedures as outlined in connection with the use of the apparatus; and, this process or method insures that a direct reading showing percentage of entrained air or gas can be accomplished without requirement or necessity for computations and manipulations of a technical or special nature, thus making the instrument and the method for metering entrained air or gas capable of employment by persons without special skill or knowledge and giving such readings in pressure observations that can be quickly and conveniently read and can be employed in the field or on the job, in the laboratory, or at any other place that may be desired. In connection with my present invention, while I have herein shown and described only certain specific embodiments in the mechanical construction of the apparatus, and have set forth only certain process or method steps and procedures, it will be appreciated that many changes and variations can be made in the construction and operation and use of the apparatus and in the carrying out of the process or method, without departing from the spirit and scope of my invention. Throughout the description, I have referred to concrete mixtures as examples of materials that can be tested, and where I have mentioned water, this will of course be understood as being an example of a liquid fluid; and also, it will be appreciated that air, where specified, will include various gases generated by chemical action or otherwise resulting, thus making my invention adaptable for various materials.

I claim:

1. In apparatus for determining the volume of entrained air and other gas in a concrete mix and like material, a sample container cup, a cover detachably fitted on said cup, a pressure chamber body carried by said cover, an air passage establishing communication from the pressure chamber to the cup, a valve normally closing said passage, a pressure gage connected with said pressure chamber, an air pressure generating means for said chamber, and means to open said valve for pressure air flow from said pressure chamber into said cup thereby changing indications of the pressure gage.

2. In apparatus for determining the volume of entrained air and other gas in a concrete mix and like material, a concrete sample container cup of known volume, a cover detachably fitted on said cup, clamp toggle levers swingably mounted at spaced locations around said cover, clamp members carried by said levers expansible outwardly when the levers are in open position and engaging and clamping against a part of the cup when said levers are in clamping position, a pressure chamber body carried by said cover, said cover having an air passage establishing communication from the pressure chamber to the cup, a valve normally closing said passage, a pressure gage connected with said pressure chamber, and air pressure generating means for said chamber, and means to open said valve for compressed air flow from said pressure chamber into said cup thereby changing indications of the pressure gage.

3. In apparatus for determining the volume of entrained air and other gas in a concrete mix and like material, a sample container cup, a cover detachably fitted on said cup, releasable clamp means on the cup, O-ring packing means establishing fluid tight closure of the cover on the cup, a pressure chamber body carried by said cover, said cover having an air passage establishing communication from the pressure chamber to the cup, a valve normally closing said passage, a pressure gage connected with said pressure chamber, air pressure generating means for said chamber, and manually operable means to open said valve for pressure air flow from said pressure chamber into said cup thereby equalizing the pressure and changing indications of the pressure gage.

4. In apparatus for determining the volume of entrained air and other gas in a concrete mix and like material, a sample container cup, a cover detachably fitted on said cup, a closed pressure chamber body carried by said cover, an air passage establishing communication from the pressure chamber to the cup, a valve normally closing said passage, a pressure gage connected with said pressure chamber, an air pressure generating pump within said chamber having an operating handle outside the chamber and manually operable means to open said valve for pressure air flow from said pressure chamber into said cup thereby changing indications of the pressure gage.

5. In apparatus for determining the volume of entrained air and other gas in a concrete mix and like material by pressure observations, a concrete sample container cup having an open top, a cover detachably fitted and clamped on the open top of said cup, a closed pressure chamber body carried by said cover, said cover having an air passage establishing communication from the pressure chamber to the cup, a valve normally closing said passage, a pressure gage connected with said pressure chamber, air pressure generating means for said chamber by which the pressure can be raised to a desired initial pressure, and means to open said valve for pressure air flow from said pressure chamber into said cup thereby changing the equalized pressure to a degree directly proportional to the percentage of entrained air in the sample of concrete mix in the cup and giving observable percentage indications on the pressure gage.

6. Apparatus for metering entrained air and gas in concrete by pressure observations comprising an open-topped cut to contain a sample quantity of concrete of predetermined volume, a cover for said open top having an air passage therethrough, clamp means securing said cover on said cup, a pressure chamber body carried by said cover around the air passage, pressure gage means communicating with said pressure chamber, a needle valve normally closing said air passage, a pump for accumulating air pressure in said pressure chamber to a desired initial pressure on said gage, and manually operable means to open said valve for escape of air under pressure into said cup.

7. Apparatus for metering entrained air and gas in concrete by pressure observations comprising an open-topped cup to contain a sample quantity of concrete of predetermined volume, a close cover for said open top having an air passage therethrough, toggle clamp means securing said cover on said cup, a pressure chamber body carried by said cover around the air passage, pressure gage means communicating with said pressure chamber, a valve normally closing said air passage, a pump for accumulating air pressure in said pressure chamber to a desired initial pressure on said gage, and manually operable means to open said valve for equalization of pressure within the cup and the pressure chamber to thereby affect readings of the pressure gage.

8. Apparatus for metering entrained air and gas in concrete by pressure observations comprising an open-topped cup to contain a sample quantity of concrete of predetermined volume, a cover for said open top having an air passage substantially centrally therethrough, clamp means securing said cover in fluid tight fitting on said cup, a pressure chamber body carried on the upper side of said cover around the air passage, pressure gage means connected with said pressure chamber, a needle valve normally closing said air passage, a pump housed in said chamber and having an outside operating handle for accumulating air pressure in said pressure chamber to a desired initial pressure on said gage, and manually operable means also outside of the chamber to open said valve for escape of air under pressure into said cup.

9. Apparatus for metering entrained air and gas in concrete by pressure observations comprising an open-topped cup to contain a sample quantity of concrete of predetermined volume, a close cover for said open top having an air passage therethrough, clamp means securing said cover on said cup, means on said cover through which liquid can be introduced to fill the closed cup, thereby eliminating all air below the cover except the air entrained in sample, a pressure chamber body carried by said cover around the air passage, pressure gage means communicating with said pressure chamber, a needle valve normally closing said air passage, a pump for accumulating air pressure in said pressure chamber to a desired initial pressure on said gage, and manually operable means to open said valve for escape of air under pressure into said cup.

10. Apparatus for metering entrained air and gas in concrete by pressure observations comprising an open-topped cup to contain a sample quantity of concrete of predetermined volume, a close cover for said open top having an air passage therethrough, clamp means securing said cover in fluid tight fitting on said cup, means for eliminating all air below cover except entrained air in sample, a closed pressure chamber body carried by said cover around the air passage, pressure gage means graduated in percentages carried by and connected with said pressure chamber, a valve normally closing said air passage, a pump for accumulating air pressure in said pressure chamber to a desired initial pressure on said gage, and manually operable means to open said valve for escape of air under pressure into said cup thereby equalizing the pressure to a point directly proportional to the volume of the pressure chamber and the volume of entrained air in the sample quantity of concrete to indicate this percentage of entrained air and gas.

11. In apparatus for metering entrained air and gas in a concrete mix by pressure observations, an open-topped cup of known volume to contain a test quantity of concrete, a cover for the open top of said cup having an air passage therethrough, toggle clamp means to secure said cover on said cup, a pressure chamber body carried by said cover around said air passage, a pressure gage communicating with said pressure chamber, a needle valve normally closing the air passage, petcocks carried by said cover in communication with the cup, a pump to build up pressure within the pressure chamber to a desired indicated pressure, and manually operable means for opening said needle valve for the passage to permit equalization of pressure within the cup and the pressure chamber and thus give pressure observation indications on the gage.

12. In apparatus for metering entrained air and gas in a concrete mix by pressure observations, an open-topped cup of known volume to contain a test quantity of concrete, a cover for the open top of said cup having an air passage therethrough, clamp means to secure said cover in fluid tight connection on the open top of said cup, a closed pressure chamber body carried on the top of said cover around said air passage, a pressure gage carried by the top of and communicating with said pressure chamber, a needle valve normally closing the air passage, petcocks carried by said cover in communication with the cup, a pump within the chamber and having an outside operating handle to build up pressure within the pressure chamber to a desired indicated pressure on the gage, and manually operable means located adjacent to the pump handle for opening said needle valve for the passage to permit equalization of pressure within the cup and the pressure chamber and thus give pressure observation indications on the gage.

ORIN G. PATCH.

References Cited in the file of this patent

UNITED STATES PATENTS

| Number | Name | Date |
|---|---|---|
| 2,102,105 | Zahm | Dec. 14, 1937 |
| 2,113,686 | Gift | Apr. 12, 1938 |
| 2,116,617 | Cremer | May 10, 1938 |
| 2,254,006 | Exline | Aug. 26, 1941 |
| 2,266,733 | Bays et al. | Dec. 23, 1941 |